United States Patent
Nakamura (10) Patent No.: US 8,401,463 B2
(45) Date of Patent: Mar. 19, 2013

(54) RELAY STATION, RADIO COMMUNICATION SYSTEM, AND CONTROL METHOD OF RELAY STATION

(75) Inventor: Michiharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 12/409,786

(22) Filed: Mar. 24, 2009

(65) Prior Publication Data

US 2009/0247072 A1 Oct. 1, 2009

(30) Foreign Application Priority Data

Mar. 28, 2008 (JP) .................................. 2008-88252

(51) Int. Cl.
*H04B 7/185* (2006.01)
(52) U.S. Cl. ........................................... 455/7; 455/13.1
(58) Field of Classification Search ............. 455/7, 13.1, 455/517; 370/315
See application file for complete search history.

(56) References Cited

U.S. PATENT DOCUMENTS

| | | | |
|---|---|---|---|
| 4,794,649 A | 12/1988 | Fujiwara | |
| 5,799,252 A | 8/1998 | Nakagoshi et al. | |
| 5,940,771 A * | 8/1999 | Gollnick et al. | 455/517 |
| 2007/0184869 A1 | 8/2007 | Koo | |
| 2008/0108303 A1* | 5/2008 | Okuda | 455/7 |
| 2009/0218497 A1 | 9/2009 | Nishino et al. | |

FOREIGN PATENT DOCUMENTS

| | | |
|---|---|---|
| EP | 0245024 | 11/1987 |
| EP | 1748576 | 1/2007 |
| EP | 1883201 | 1/2008 |
| JP | 62260437 | 11/1987 |
| JP | 8-242483 | 9/1996 |
| JP | 2002-010330 | 1/2002 |
| JP | 2004336455 | 11/2004 |
| JP | 2006-254155 | 9/2006 |
| JP | 200848366 | 2/2008 |
| WO | 94/17605 | 8/1994 |
| WO | 2008/004099 | 1/2008 |

OTHER PUBLICATIONS

European Patent Office "Communication" issued for corresponding European Patent Application No. 09 156 316.3, dated Sep. 5, 2011.
IEEE P802.16j/D3; Part 16: "Air Interface for Fixed and Mobile Broadband Wireless Access Systems"; Multihop Relay Specification; Dated: Feb. 29, 2008.
Partial European Search Report for corresponding European Patent Application No. 09156316.3 dated Oct. 6, 2009.
Extended European Search Report for corresponding European Patent Application No. 09156316.3 dated Nov. 27, 2009.

(Continued)

*Primary Examiner* — Henry Choe
(74) *Attorney, Agent, or Firm* — Myers Wolin, LLC (57) ABSTRACT

A relay station for relaying a radio communication between a radio terminal and a base station includes a relay standby unit configured to, in a relay standby state, receive a connection request transmitted from the radio terminal to the base station in response to broadcast information from the base station; a connection request detector configured to, in a relay standby state, detect the connection request transmitted from the radio terminal to the base station; and a relay operation unit configured to relay a radio communication between the radio terminal and the base station when the relay station shifts from the relay standby state to a relay operation state in response to the connection request detected by the connection request detector in the relay standby state.

16 Claims, 9 Drawing Sheets

OTHER PUBLICATIONS

Notification of Reason (s) for Refusal issued for corresponding Japanese Patent Application No. 2008-088252 dispatched May 8, 2012 with partial English translation.

Official Office Action issued for Japanese Patent Application No. 2008-088252 with partial English translation dispatched on Jan. 31, 2012.

Yongkang Liu et al; "Relay Enhanced Architecture for Broadband Wireless Access Networks"; p. 91-95; Cross Layer Design, 2007; IWCLD '07; International Workshop on Digital Object Identifier; IEEE Conferences, Sep. 21, 2007.

* cited by examiner

RELAY STATION, RADIO COMMUNICATION SYSTEM, AND CONTROL METHOD OF RELAY STATION

CROSS-REFERENCE TO RELATED APPLICATIONS

This application is based upon and claims the benefit of priority of the prior Japanese Patent Application No. 2008-88252, filed on Mar. 28, 2008, the entire contents of which are incorporated herein by reference.

FIELD

Certain aspects of the present invention discussed herein are related to a relay station, a radio communication system and a control method of a relay station.

BACKGROUND

When base stations are installed in an area in a cellular radio communication system within which a radio communication service is provided, the geometry of the base stations installations is determined so that each radio terminal can transmit and receive radio signals with at least one base station. A service coverage area provided by one base station is referred to as a cell. Even if a plurality of base stations are installed in the service area, a dead spot in which a radio terminal cannot transmit and receive radio signals with any of the base stations may be present due to blocking of the radio signals by a restriction of geographical features or buildings.

In a typical operation, the radio terminal, when switched on, scans preset frequencies to detect whether a connectable base station is present and issues a connection request to a detected base station to establish a connection with the base station. Transmission of radio signals from the radio terminal may be prohibited if the radio terminal fails to detect the presence of a base station. Even if the radio terminal receives a radio signal from a base station, a radio signal bearing a connection request from the radio terminal may not reach the corresponding base station. In such a case, no communication is established between the radio terminal and the base station.

A relay station may be installed to establish communication between the radio terminal and the base station in a manner free from such an inconvenience. The relay station relays a radio signal from a base station to a radio terminal while also relaying a radio signal from the radio terminal to the base station. With such a relay station, the radio terminal receives a radio signal from the relay station instead of directly receiving the radio signal from the base station, and therefore communication is consequently established between the base station and the radio terminal. The relay station also relays a radio signal that is transmitted by the radio terminal to the base station, and the base station recognizes that the relayed radio signal is transmitted from the radio terminal. Thereafter, communication is continuously established.

Specifications of the relay station have been studied by an IEEE802.16 working group under Institute of Electrical and Electronics Engineers (IEEE). According to draft specifications, a transparent mode relay station and a non-transparent relay station are defined (IEEE draft standard P802.16j/D3). In a transparent mode, the radio terminal receives control information, such as preamble, UL MAP, DL MAP broadcasted from the base station and the relay station relays data communications but does not relay the control information. In a non-transparent mode, the relay station operates as if it is equivalent to the base station with respect to the radio terminal. The relay station in non-transparent mode usually transmits the broadcast information that is normally transmitted by the base station.

Japanese Patent Laid-Open Publication No. 2006-254155 discloses a technique that allows the presence of a relay apparatus for establishing a connection to a base station without an increase in power consumption in a multihop connection between the radio terminal and the base station. According to this technique, the relay apparatus performs a predetermined reception operation for a time period that is equal to a reception slot of a control signal from the base station, thereby reducing an increase in power consumption.

If the broadcast information from the base station reaches the radio terminal in the radio communication between the radio terminal and the base station, the radio terminal transmits a connection request to the base station. If the transmitted connection request fails to reach the base station, then the base station does not recognize the radio terminal. This means that the base station does not recognize the presence of the radio terminal which requires the relay operation by the relay station. Thus, in such situation, the base station is not triggered to start the communication with the radio terminal.

If the relay station is set to be continuously ready for relay operation in order to reliably deliver the connection request from the radio terminal to the base station, the relay station continuously consumes power for the relay operation. In the situation in which a connection request may come in at an unknown timing, power is consumed in vain. In order for the relay station in the non-transparent mode to be continuously ready for relay operations, the relay station continuously transmits the broadcast information sent from the base station. The radio signal resources are used in vain if the relay station continuously transmits the broadcast information in the situation where the presence or absence of a target radio terminal is unknown. Such an operation may interfere with the surrounding communication, leading to degradation in performance of the entire radio communication system.

SUMMARY

A certain aspect of the invention is to control consumption of power or radio resources in relaying radio signals to a radio terminal and to a base station.

In a certain aspect of the invention, a relay station for relaying radio communications between a radio terminal and a base station includes a relay standby unit which is configured to receive a connection request transmitted from the radio terminal to the base station in response to broadcast information from the base station; a connection request detector configured to detect the connection request transmitted from the radio terminal to the base station; and a relay operation unit configured to relay radio communications between the radio terminal and the base station when the relay station shifts from the relay standby state to a relay operation state, in response to the connection request detected by the connection request detector in the relay standby state.

In a certain aspect of the invention, a control method for a relay station which relays radio communications between a radio terminal and a base station includes restricting a reception of a first radio resource information, which indicates a radio resource by which burst data is transmitted, and a second radio resource information, which indicates a radio resource by which a random-access signal is transmitted from the radio terminal; detecting the random-access signal in accordance with the second radio resource information; starting to receive the burst data in accordance with the first radio resource information in response to detecting the random-access signal transmitted by the radio terminal; and establishing a communication path with the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

Embodiments for carrying out the present invention are described with reference to the figures. Step numbers in certain figures do not necessary limit the order or timing of performing the described operations.

In accordance with a first aspect of an embodiment, a relay station starts a relay operation in response to a detection of a connection request transmitted from the radio terminal to the base station. The relay station includes a relay standby unit, which is enabled to receive a connection request that is transmitted from the radio terminal to the base station in response to broadcast information (control information), such as a preamble, UL MAP, DL MAP from the base station. The relay station also includes a connection request detector configured to detect the connection request transmitted from the radio terminal to the base station and a relay operation unit configured to relay the radio communications between the radio terminal and the base station when the relay operation unit shifts from the relay standby state to a relay operation state in response to the connection request that is detected by the connection request detector.

Preferably, the relay standby unit in the relay station sets the relay standby state when it is not necessary to perform a relay operation between the radio terminal and the base station. In the relay standby state, the relay station does not completely suspend the function thereof, but is ready to receive the connection request of the radio terminal which is transmitted in response to the broadcast information from the base station. The start of the relay operation, from the relay operation unit, is triggered when the connection request detector detects the connection request from the radio terminal received in the relay standby state.

Since the relay station uses the connection request from the radio terminal as a trigger to start relaying radio communications, the relay station may be prevented from being continuously operative. Such a limited operation, such as receiving the connection request, is performed while other processes in the relay operation are not performed. This arrangement controls power consumption and the use of the radio signal resources of the relay station. Communications between the relay station and the base station may be established in accordance with the necessity of the relay operation. Alternatively, communications between the relay station and the base station may be continuously established. From the standpoint of power saving, the former method is preferable.

The radio communication relay station may further include a response determiner that is configured to determine a presence or absence of a response from the base station which is responsive to the connection request transmitted from the radio terminal and detected by the connection request detector. The relay operation unit shifts from the relay standby state to the relay operation state and relays the radio communications between the radio terminal and the base station if the connection request detector detects the connection request and the response determiner does not verify any response from the base station, which is responsive to the connection request. The response determiner determines the presence or the absence of the response from the base station, which is responsive to the connection request transmitted from the radio terminal. The response determiner can reliably confirm the status that needs the relay operation of the relay station. Since the relay station startup process is started in response to the determination by the response determiner, an unnecessary startup of the relay station is avoided. In other words, the base station is notified of the connection request from the radio terminal only when the connection request is necessary. This arrangement controls the unnecessary use of power and radio signal resources by the relay station.

The response determiner may determine the presence or absence of the response from the base station that is responsive to the connection request, based on information which is transmitted from the base station and related to a response status of the base station that is responsive to the connection request from the radio terminal. More specifically, the presence or absence of the response from the base station that is responsive to the connection request from the radio terminal is more accurately determined using information related to the response status that is explicitly transmitted from the base station. The information related to the response status may be response information that is responsive to the connection request from an unspecified radio terminal, or response information that is responsive to the connection request from a specified radio terminal.

The relay operation unit may determine whether to shift to the relay operation state, based on a signal intensity or a signal quality of the connection request that is transmitted from the radio terminal and received by the relay station. With this arrangement, the signal intensity or the signal quality of the connection request exchanged between the radio terminal and the base station at the start of the operation of the relay station satisfies predetermined criteria. Radio communications between the two parties are reliably maintained after the relay station is started.

The radio communication relay station may further include a predictor that is configured to predict the signal intensity or the signal quality of the connection request when the connection request transmitted from the radio terminal is to be received by the relay station. The relay operation unit determines whether to shift to the relay operation state, based on the signal intensity or the signal quality of the connection request that is predicted by the predictor. The signal of the connection request may be transmitted from the radio terminal in a variety of patterns. Thereafter, the predictor predicts variations in the signal of the connection request in accordance with the patterns, and the relay operation unit determines, based on the prediction results, whether the connection request signal is sufficient to continue reliably the subsequent relay operation, and then shifts to the relay operation state.

The relay operation unit may perform radio communications with the radio terminal by shifting to an equivalent communication state, in which a communication operation that is equivalent to the communication operation of the base station with respect to the radio terminal is performed, rather than by shifting from the relay standby state to the relay operation state. More specifically, this arrangement causes the relay station to emulate a substitute base station. In this case, the relay operation unit may perform wired communications between the base station and the radio communication relay station. The relay operation unit may also perform in wired communications a relay operation with a predetermined control network as a relay destination instead of the base station.

In accordance with a certain aspect of an embodiment, a radio communication system includes the radio communication relay station for performing radio communications between the base station and the radio terminal. In the radio communication system, a transmission range of the broadcast information that is used for the initial synchronization process in a down link direction is set to be larger than a transmission range of the connection request in an up link direction. With this arrangement, depending on a relative position (e.g. distance) of each radio terminal with respect to the base station, there may be a radio terminal that may receive the broadcast information from the base station but has difficulty in directly transmitting the connection request in response to the broadcast information. However, since the radio communication system includes the relay station that is started in response to the connection request from the radio terminal, communications are established between the radio terminal and the base station. In this way, the radio communication coverage area (also referred to as a cell) of the base station with the radio terminal is expanded.

In order to set the transmission range of the broadcast information in the down link direction to be larger than the transmission range of the connection request in the up link direction, a transmission level, a modulation method, and an encoding ratio or the like are properly adjusted depending on the down link direction or the up link direction. The broadcast information in the down link direction may be transmitted using repetition code.

Figure 1:
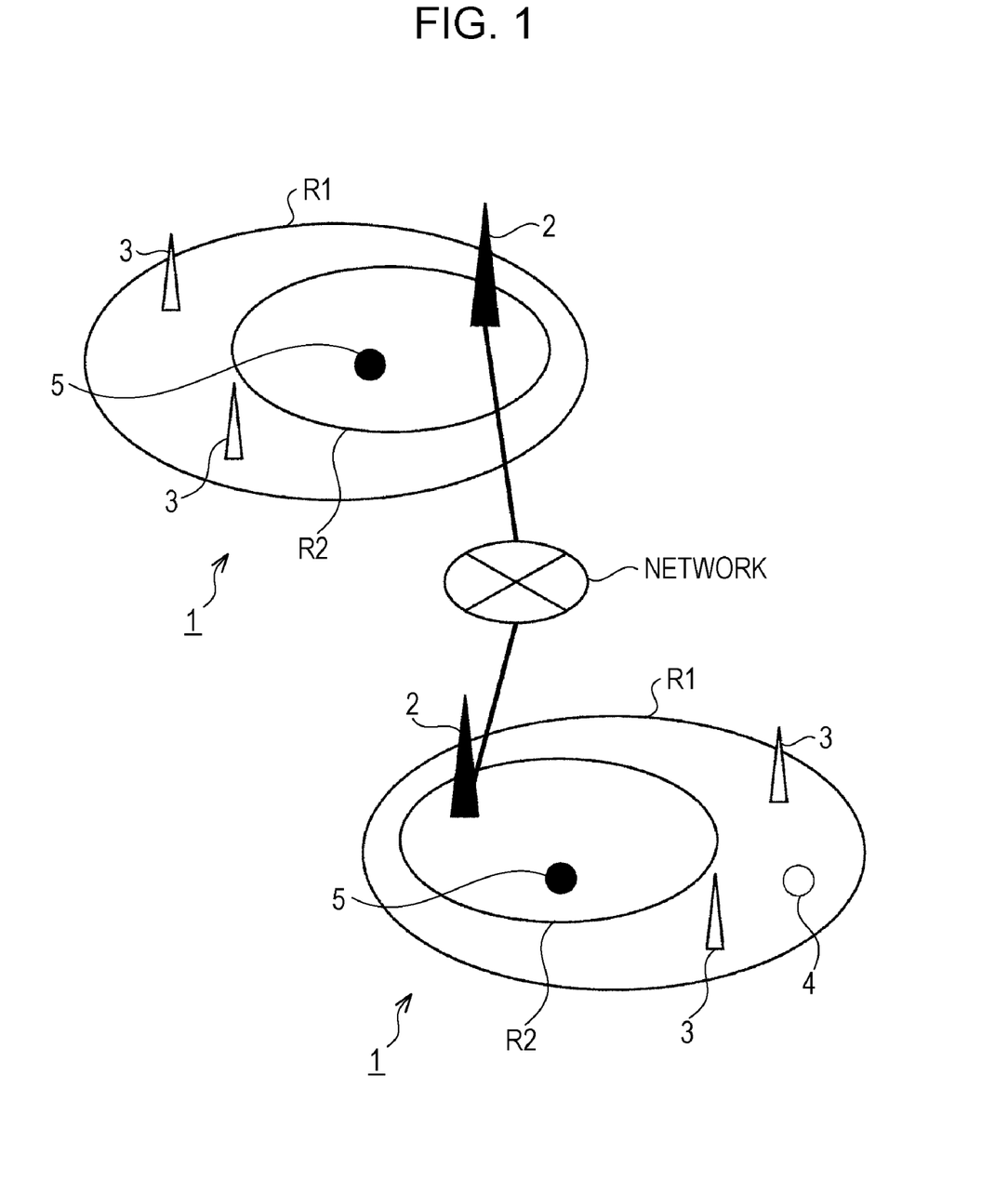
FIG. 1 is a configuration example of a radio communication system.

Next, an embodiment is explained in accordance with FIG. 1.

FIG. 1 illustrates a configuration in which two radio communication systems are connected via a network. The radio communication systems are basically identical to each other. Since there is no need to describe the systems individually, only one radio communication system 1 is described in detail. The radio communication system 1 includes one base station 2. The base station 2 is connected to a base station 2 in another radio communication system in a communication ready state via the network. Radio terminals 4 and 5 (illustrated in FIG. 1) are present in a communication coverage area of the base station 2 (hereinafter referred to as a cell) may transmit and receive radio signals with another radio terminal present within the cell of the base station 2 or another radio terminal present in a cell of another base station 2.

The radio communication system 1 also includes a relay station 3 in addition to the base station 2. The relay station 3 relays a radio signal from the base station 2 to a radio terminal within the cell while relaying a radio signal from a radio terminal within the cell to the base station. Through this relay operation, communication is established between the base station and the radio terminal, thereby allowing the cell of the radio communication system 1 to be expanded.

A general sequence for establishing an initial connection of radio communication among the base station 2 and the radio terminals 4 and 5 in the radio communication system 1 is described below. The base station 2 transmits a predetermined synchronization signal, such as a preamble signal, and resource information that is related to a random-access channel. Through the random-access channel, a radio terminal having not yet established communication (such as the one in a state immediately after switch-on) will later on transmit a communication request to the base station 2. Since the synchronization signal and the resource information are broadcasted within the cell, those are referred to as broadcast information. In response to the broadcast information, the radio terminal transmits the connection request to the base station 2 via the random-access channel, which is designated by the resource information. Thus, the base station 2 recognizes the presence of the radio terminal, and communication is established between the radio terminal and the base station 2.

The cell of the radio communication system 1 may be divided into two areas, R1 and R2, respectively. The broadcast information from the base station 2 reaches the radio terminal 4 within the area R1 but the connection request from the radio terminal 4 may not directly reach the base station 2. When the radio terminal 4 transmits the connection request, the relay station 3 performs a relay operation to establish communications between the radio terminal 4 and the base station 2. The broadcast information (preamble, resource information or the like) from the base station 2 reaches the radio terminal 5, which is present within the area R2, and the connection request from the radio terminal 4 directly reaches the base station 2. When the connection request is transmitted from the radio terminal 5, communications are established between the radio terminal 5 and the base station 2 without the relay station 3 performing the relay operation.

A reception coverage area (R1) of the radio terminal in a direction from the base station 2 to the radio terminals 4 and 5 (referred to as a down link direction) is set to be wider than a transmission coverage area (R2) of the radio terminal with reference to the base station 2 in a direction from each radio terminal to the base station 2 (referred to an up link direction). The area within which the broadcast information used for initial synchronization with the radio terminal is reachable to the radio terminal is unbalanced with the area within which the connection request corresponding thereto is reachable to the base station (in a state shown in FIG. 1). However, the relay station 3 is included in the radio communication system 1. Using the relay station 3, a radio terminal (such as the radio terminal 4 which is present within the area R1), can establish a radio connection with the base station 2. More specifically, the unbalanced state of the areas R1 and R2 contributes to expanding the area of the cell of the radio communication system 1 based on the base station 2.

The unbalanced state of the areas R1 and R2 may be due to the following 5 reasons.

(1) A transmission level of an initial synchronization signal (for example, the preamble, resource information or the like)

in a down link direction is set to be higher than a transmission level of an initial synchronization signal for which the coverage area of the down link and that of uplink is balanced.

(2) A modulation method of the initial synchronization signal in the down link direction is set to be lower than a modulation method of the initial synchronization signal for which the coverage area of the down link and that of uplink is balanced.

(3) An encoding ratio of the initial synchronization signal in the down link direction is set to be lower than an encoding ratio of the initial synchronization signal for which the coverage area of the down link and that of uplink is balanced.

(4) When spread spectrum communication is performed in radio communication with the base station 2, a spreading ratio in the initial synchronization signal in the down link direction is to be higher than a spreading ratio in the initial synchronization signal for which the coverage area of the down link and that of uplink is balanced.

(5) The initial synchronization signal in the down link direction is transmitted in repetition encoding transmission with higher rate for which the coverage area of the down link and that of uplink is balanced.

These methods may be used solely or in combination.

Figure 2:
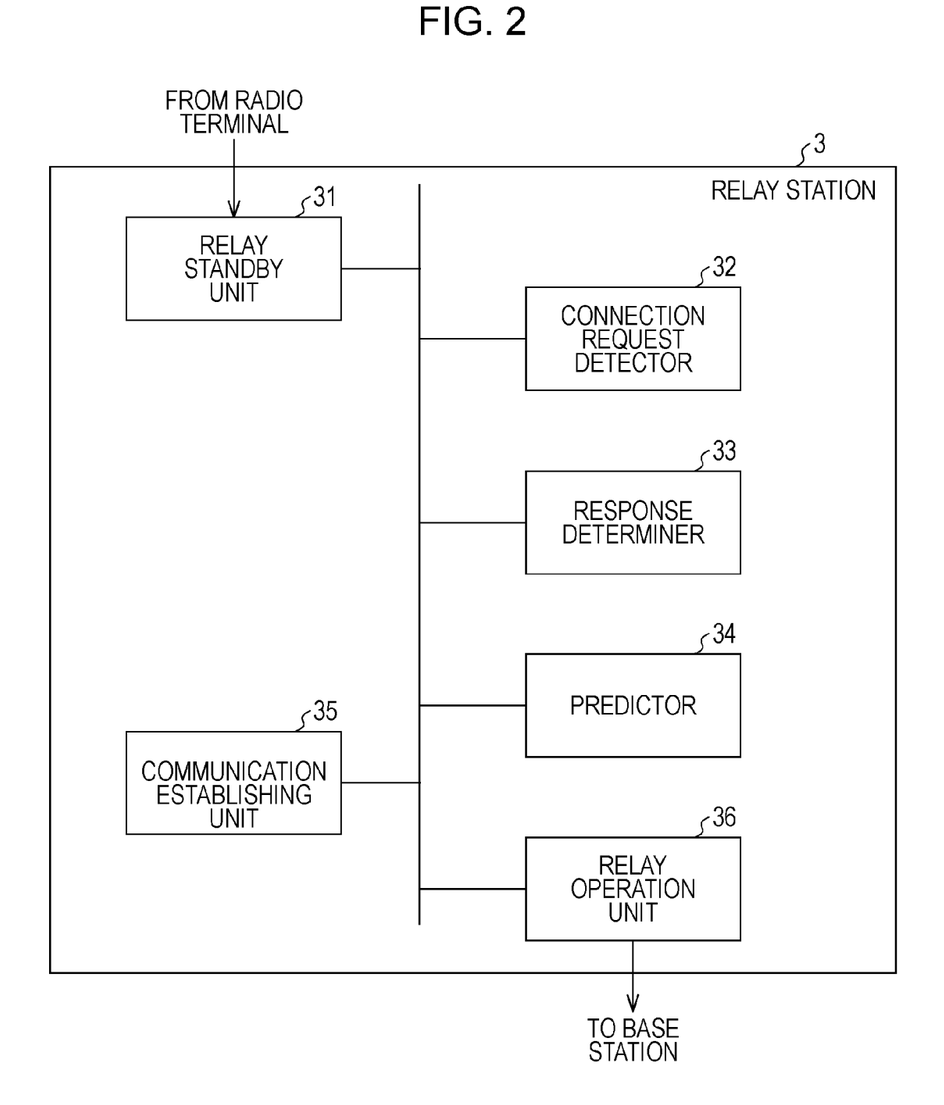
FIG. 2 is a block diagram example of a relay station.

The relay station 3 performs the relay operation intermittently. More specifically, the relay station 3 performs the relay operation that is needed in response to the connection request from the radio terminals 4 and 5, rather than performing the relay operation continuously. In this way, the unnecessary use of power and frequency resources by the activation of the relay station 3 is controlled. A configuration of the relay station 3 is illustrated in FIG. 2. Each element in FIG. 2 may be embodied by a controller in a relay station 3 by executing a predetermined control program. The elements are described below from the standpoint of interactions thereof.

A relay standby unit 31 stops processes that are related to the relay operation, other than a reception of the connection request from the radio terminals (including the radio terminals 4 and 5), and sets the relay station 3 into a relay standby state. The relay station 3 which is set in the relay standby state by the relay standby unit 31 consumes power for the reception of the connection request of the radio terminals 4 and 5 and other radio terminals. To receive the connection request from the radio terminals 4 and 5 or the like, the reception operation is performed at the random-access channel for the transmission of the connection request of each radio terminal, based on the broadcast information, which may include resource information indicative of a radio resource for the random-access channel, which is transmitted from the base station 2. A connection request detector 32 detects a connection request from the radio terminal in response to the broadcast information from the base station 2 (the radio terminals 4 and 5 in the present embodiment) through the reception operation of the relay standby unit 31 at the random-access channel.

A response determiner 33 determines whether the base station 2 has responded to each of the radio terminals having transmitted the connection request. A predictor 34 predicts a signal intensity or a signal quality of the connection request from each radio terminal in order to determine whether the relay operation of the relay station 3 may be reliably performed. If communications have not been established between the base station 2 and the relay station 3, a base station communication establishing unit 35 establishes the connection. If the communication is established, the base station communication establishing unit 35 maintains the communications. A relay operation unit 36 notifies the base station 2 of the connection request that is received from the radio terminal based on the process results of each of the above elements, and then shifts from the relay standby state to a relay operation state in order to perform relay communications between the radio terminal and the base station 2.

A startup process of the relay station 3, including the above-described elements, is described below with reference to FIGS. 3 and 4A and 4B. In the startup process, the relay station 3 leaves the relay standby state and starts up. In one example, the relay startup process is performed in response to the radio terminal 4 that may not directly transmit the connection request to the base station 2. In step S101, the relay standby unit 31 determines whether a connection request from the radio terminal 4 has been received. If the answer to the determination in step S101 is non-affirmative, the relay standby unit 31 keeps the relay operation of the relay station 3 at the standby state in step S102. If the answer to the determination in step S101 is affirmative, processing proceeds to operation S103. The connection request detector 32 detects a connection request from the radio terminal 4.

If the connection request detector 32 detects the connection request from the radio terminal 4 in step S103, the relay station 3 starts up in step S104 and subsequent steps. First, in step S104, the relay station 3 transmits the connection request thereof to the base station 2 at the random-access channel. More specifically, in the state in which the relaying process is not started, it is not necessary that the relay station 3 be connected to the base station 2. Along with the startup of the relay station 3 for the radio terminal 4, communication is newly established between the relay station 3 and the base station 2. Subsequent to step S104, communication is established between the relay station 3 and the base station 2 in response to a response from the base station 2 (in step S105). Process steps S104 and S105 are executed by the base station communication establishing unit 35. If communication has already been established between the relay station 3 and the base station 2, then performing process steps S104 and S105 is not necessary.

Once communication is established between the relay station 3 and the base station 2, the relay operation unit 36 notifies the base station 2 of the connection request from the radio terminal 4 via the established communication (step S106). The relay station 3, instead of the radio terminal 4, notifies the base station 2 of the connection request from the radio terminal 4, thereby establishing communications between the radio terminal 4 and the base station 2. The relay station 3 thus shifts from the relay standby state to the relay operation state. The relay station 3 starts up in response to the detection of the connection request by the connection request detector 32. The startup of the relay station 3 is thus adjusted so that the overuse of power and frequency resources by the relay station 3 is controlled.

Figure 4A:
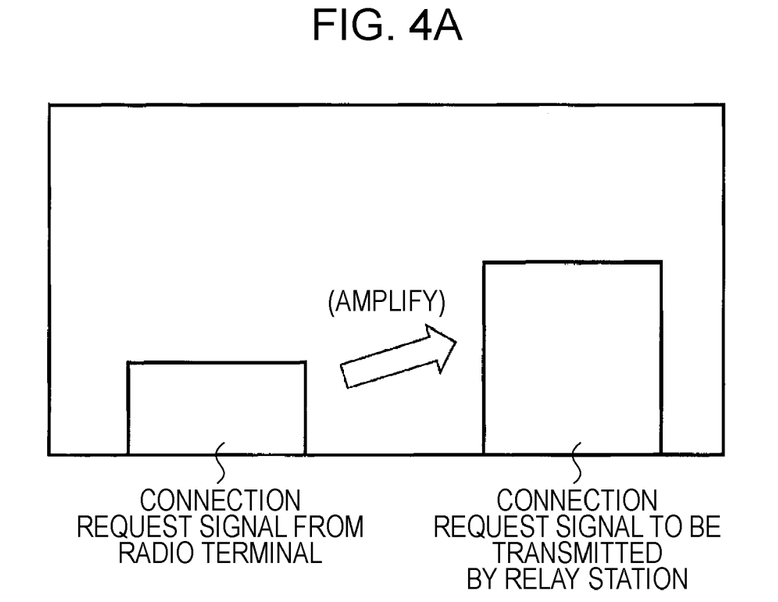
FIG. 4A illustrates a first notification operation in which the relay station notifies a base station of a connection request transmitted by a radio terminal.
Figure 4B:
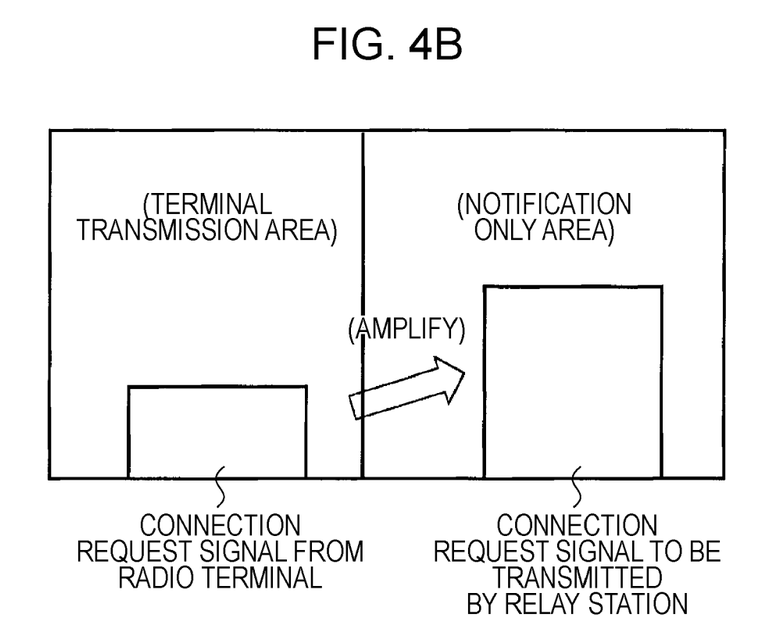
FIG. 4B illustrates a second notification operation in which the relay station notifies the base station of a connection request transmitted by the radio terminal.

A notification method of notifying the base station 2 of the connection request may be executed as described in FIGS. 4A and 4B so that the relay operation unit 36 shifts from the relay standby state to the relay operation state.

In the method of FIG. 4A executed in the up link direction to the base station 2, the connection request is transmitted at the random-access channel used by the radio terminal 4. That is, the connection request is transmitted by using a radio resource (R) (for example, random-access channel) which is defined by resource information transmitted from the base station 2 as a radio resource for transmission of connection request of the radio terminal. In this case, the relay station 3 amplifies a connection request signal and relays the amplified connection request by using the radio resource (R). In the method illustrated in FIG. 4B, the connection request is transmitted to the base station 2 using a resource assigned to the relay station 2 for transmission of notification, which is different from the radio resource (for example, random-access channel) for the terminal. In this case, the base station 2 recognizes the connection request relayed by the relay station 3 rather than the connection request directly transmitted by the radio terminal 4.

Figure 5:
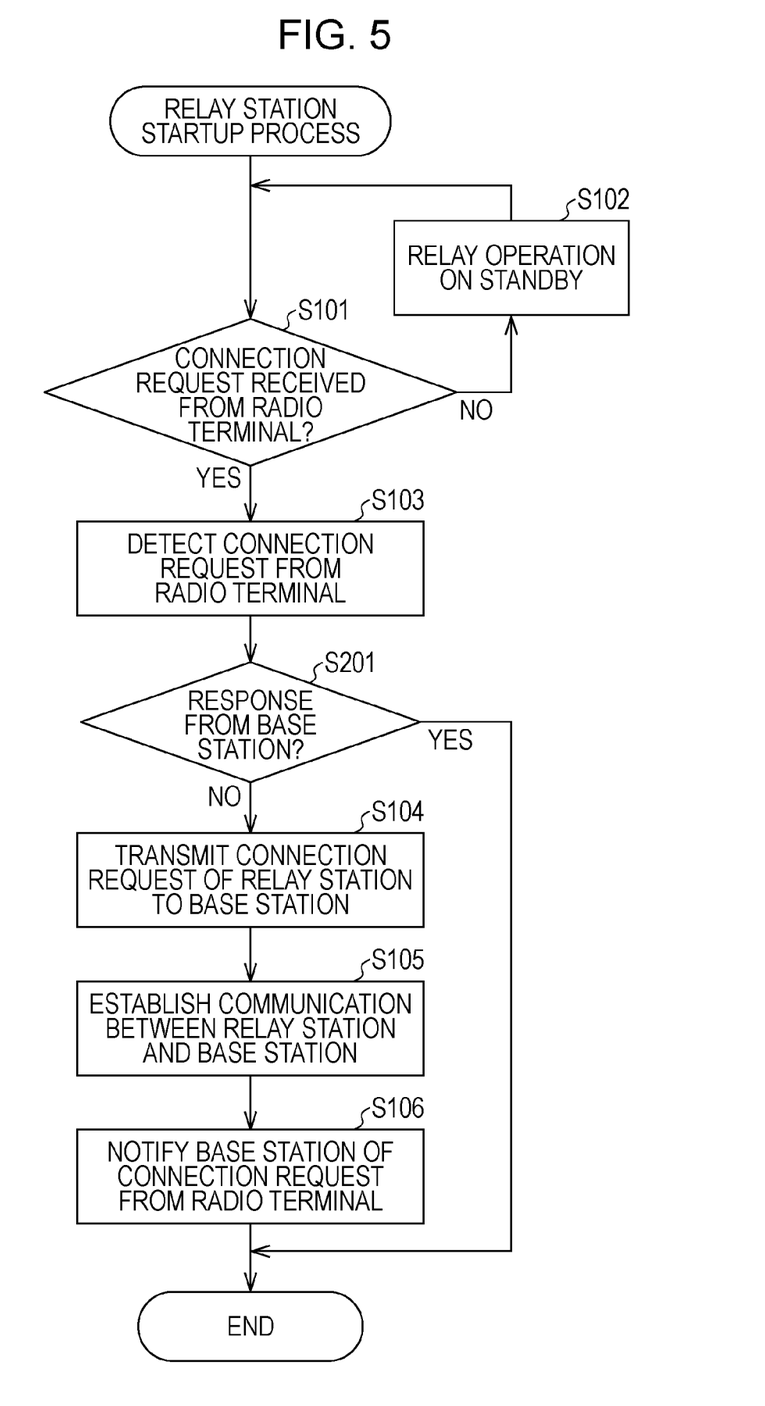
FIG. 5 is a second flow of the startup process of the relay station.

Next, an embodiment is explained in reference to FIG. 5.

An embodiment of the startup process of the relay station 3 is described below with reference to FIG. 5. The process steps in the flowchart illustrated in FIG. 5 that are identical to those in the flowchart illustrated in FIG. 3 are designated with the same process step numbers and the discussion thereof is omitted here. In the relay station startup process of this embodiment, a determination step is performed in step S201 subsequent to step S103. In step S201, the response determiner 33 determines whether the base station 2 has transmitted a response in response to the connection request transmitted from each radio terminal. The sequence of the base station 2 subsequent to the connection request performed by each radio terminal at the random-access channel is typically defined. By monitoring the sequence, the response determiner 33 determines whether the base station 2 has responded to the radio terminal having transmitted the connection request detected in step S103.

Since the radio terminal 5 is located in an area R2 in which the radio terminal communicate with the base station 2 directly as illustrated in FIG. 1, the base station 2 may recognize the connection request from the radio terminal 5. The base station 2 thus responds to the connection request. By monitoring this process, the response determiner 33 determines that the base station 2 has responded (affirmative answer to the determination in step S201). On the other hand, the radio terminal 4 is not present within the area R2, and the base station 2 may not recognize the connection request from the radio terminal 4. The base station 2 does not respond to the connection request. By monitoring this process, the response determiner 33 determines that the base station 2 has not responded for a constant period of time since the detection of the connection request in step S103. The response determiner 33 thus determines that the base station 2 has not transmitted a response in response to the radio terminal 4 (non-affirmative answer to the determination in step S201).

If an affirmative answer is obtained in the determination in step S201, the base station 2 directly communicates with the radio terminal 5, and it is not necessary to start up the relay station 3. In such a case, the relay station ends the process without starting the relaying operation. If a non-affirmative answer is obtained in the determination in step S201, then no direct communication is made between the radio terminal 4 and the base station 2. The relay station 3 is thus started up in step S104 and subsequent steps. The startup of the relay station 3 is properly adjusted. Therefore, the overuse of power and frequency resources by the relay station 3 is controlled.

Next, an embodiment is explained with reference to FIG. 6.

Figure 3:
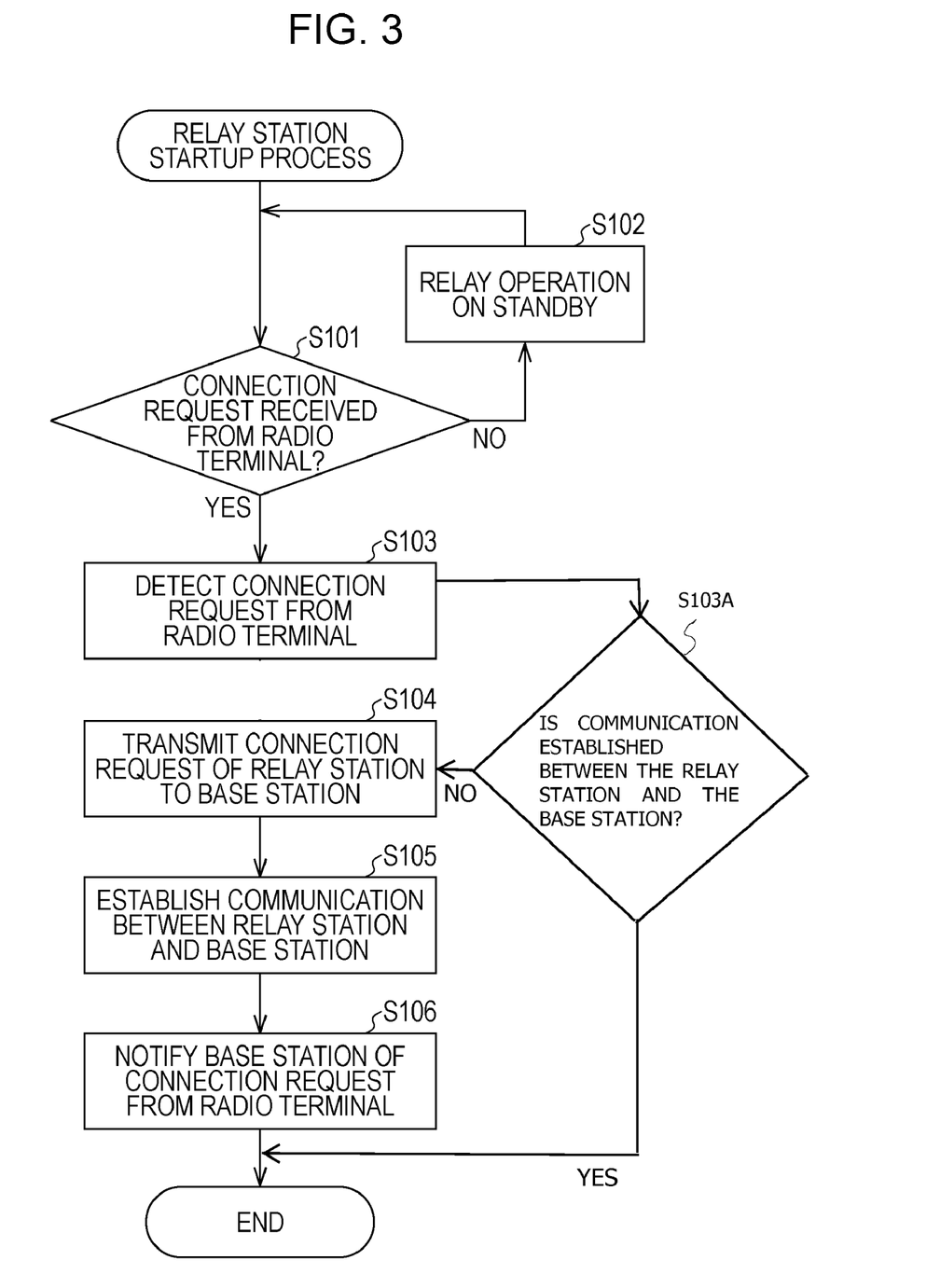
FIG. 3 is a first flow of a startup process of the relay station.
Figure 6:
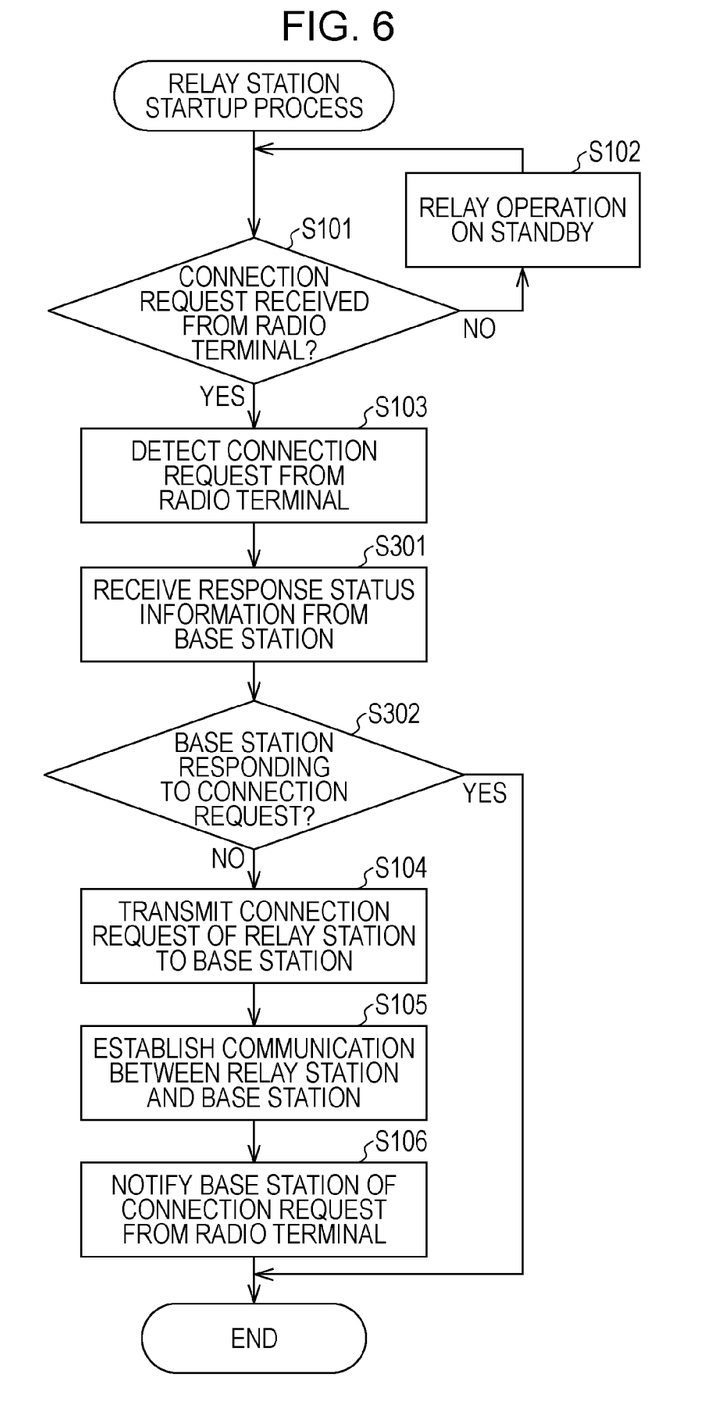
FIG. 6 is a third flow of the startup process of the relay station.

The process steps in the flowchart illustrated in FIG. 6 that are identical to those in the flowchart illustrated in FIG. 3 are designated with the same process step numbers and the discussion thereof is omitted here. In the relay station startup process of this embodiment, the response determiner 33 performs process steps in S301 and S302 subsequent to step S103. In step S301, response status information is received from the base station 2. The response status information relates to the presence or absence of the connection request from the radio terminal that is recognized by the base station 2. In the discussion of this embodiment, the response status information explicitly indicates that the connection request from the radio terminal, the presence of which the base station 2 recognizes, fails to reach the base station 2. Such radio terminals include the radio terminals 4 and 5, which, although in communication with the base station 2 some moments ago, are currently disconnected from the base station 2. Another such device includes a radio terminal which is designed to move within either area R1 or R2 to communicate with the base station 2. Processing proceeds to step S302 subsequent to step S301.

It is determined in step S302, in accordance with the response status information received in step S301, whether the base station 2 recognizes the radio terminal having transmitted the connection request detected in step S103 and has given a response. The response status information output from the base station 2 is used to determine the presence or absence of the response in response to the connection request from the radio terminal. If the answer in step S302 is non-affirmative, process step S104 and subsequent steps are executed for the relay station 3 to start the relay operation. If the answer in step S302 is affirmative, the relay station startup process ends. To reliably determine the response from the base station 2, the determination process step in step S201 in the flowchart of FIG. 5 may be also executed. The overuse of power and frequency resources by the relay station 3 is thus controlled.

Figure 7:
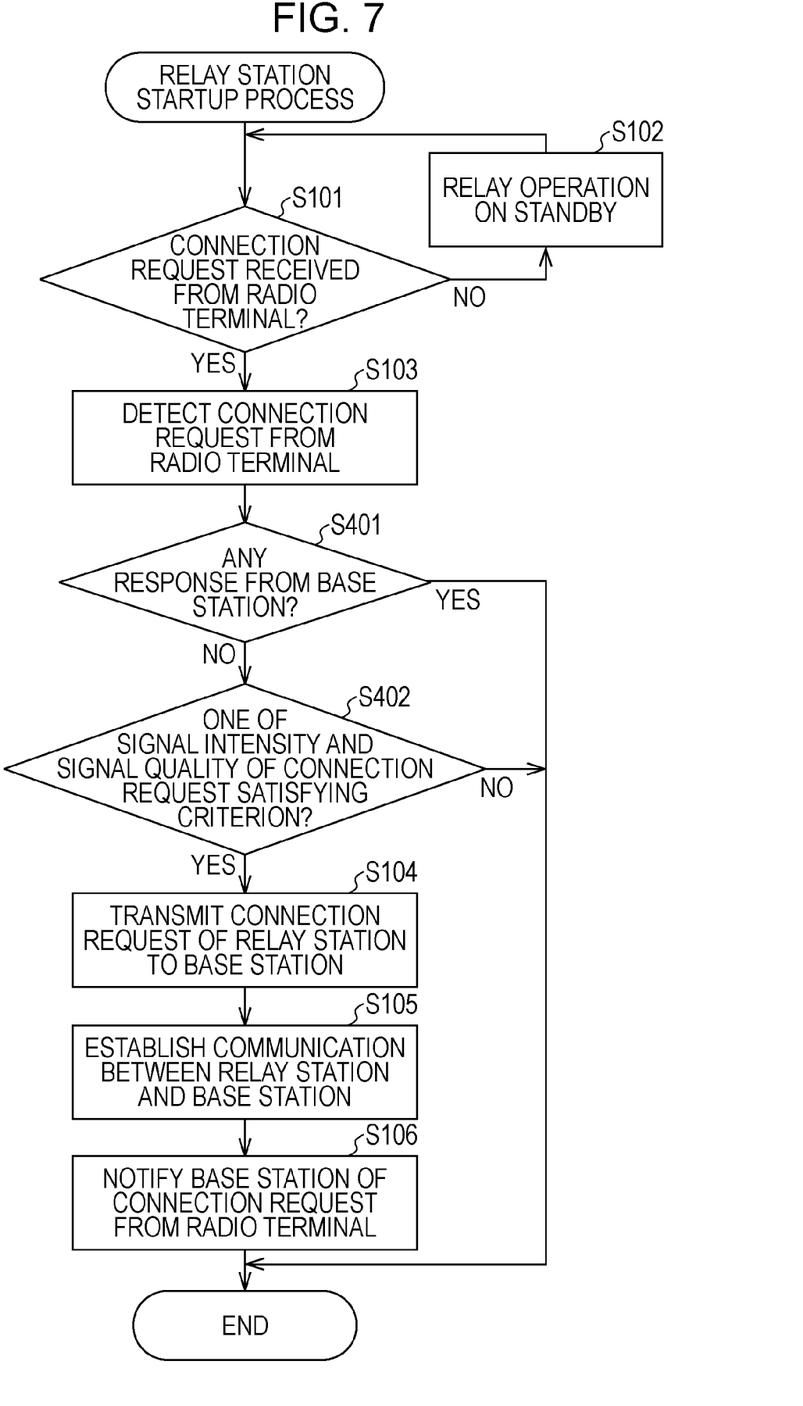
FIG. 7 is a fourth flow of the startup process of the relay station.

Next, an embodiment is explained with reference to FIG. 7.

An embodiment of the relay station 3 is described below with reference to FIG. 7. The process steps in the flowchart illustrated in FIG. 7 that are identical to those in the flowchart illustrated in FIG. 3 are designated with the same process step numbers and the discussion thereof is omitted here. In the relay station startup process of this embodiment, process steps in S301 and S302 are performed subsequent to step S103. In step S401, as in step S201 illustrated in FIG. 5, the response determiner 33 determines whether the base station 2 has transmitted a response in response to the connection request from the radio terminal. If the answer to step S401 is affirmative, the relay station startup process ends. If the answer to step S401 is non-affirmative, a determination operation in step S402 is performed. The order of the determination operation in step S401 and the determination operation in step S402 may be reversed in FIG. 7.

In step S402, the predictor 34 determines whether the signal intensity or the signal quality of the connection request that is detected in step S103 satisfies the predetermined criterion of one of the signal intensity or the signal quality. Alternatively, the predictor 34 predicts the signal intensity or the signal quality of the signal expected to arrive from the radio terminal having output the connection request, i.e., the signal intensity and the signal quality of the signal expected to arrive from the radio terminal when the relay station 3 performs the relay operation, and then determines whether the predicted results satisfies the signal intensity serving as a criterion. This determination operation is performed to maintain a reliable communication state between the radio terminal and the relay station 3 so that the relay station 3 reliably performs the relay operation.

The prediction of the predictor 34 of the signal intensity or the like of the signal from the radio terminal may be performed in accordance with a sequence or the like according to which the connection request is transmitted from the radio terminal. For example, if the signal intensity or the like of the connection request output from the radio terminal increases with time, the predictor 34 predicts how the signal intensity or the like changes at the start of the relay operation, in accordance with a rate of change of the signal intensity or the like at the radio terminal, based on the signal intensity or the like at the operation time at step S402 and a time duration until the start of the relay operation. If the answer to step S402 is affirmative, steps S104 and subsequent steps are performed for the relay station 3 to start the relay operation. If the answer to step S402 is non-affirmative, the relay station startup process ends. The startup of the relay station 3 is thus reliably executed. The relay operation performed by the relay station 3 is reliably performed.

Next, an embodiment is explained.

In the operation of the relay station in the foregoing discussion, the relay operation is started up in response to the detection of the connection request signal from the radio terminal, the absence of the response from the base station, or the response status information from the base station. A signal is thus relayed between the radio terminal and the base station. A relay station, such as a non-transparent relay station defined in IEEE draft standard P802.16j described above, may operate as an equivalent to the base station with respect to the radio terminal. The foregoing technical discussion of the relay station is applicable to this type of relay station. The relay operation in the mode equivalent to the base station may be started in response to the detection of the connection request signal from the radio terminal, the absence of the response from the base station, or the response status information from the base station. In such a case, even if no connection is established in response to a first communication request, the radio terminal may issue a new connection request to a relay station that is started up in response to the first communication request, and operates in a manner equivalent to the base station. The radio terminal thus establishes communication with the relay station. The relay station may shift to a transparent communication state, thereby starting communication.

As for the relay station that operates in a manner equivalent to the base station with respect to the radio terminal, the communication between the relay station and the base station may not only be radio communication separately established between the relay station and the base station, but also separately established wired communication. In the case of wired communication, the relay station that operates in a manner equivalent to the base station with reference to the radio terminal is not limited to the base station as a relay destination. In the same manner as an ordinary base station, the relay station may be an apparatus (e.g. controller) on a communication network.

Next, an embodiment is explained.

Figure 8A:
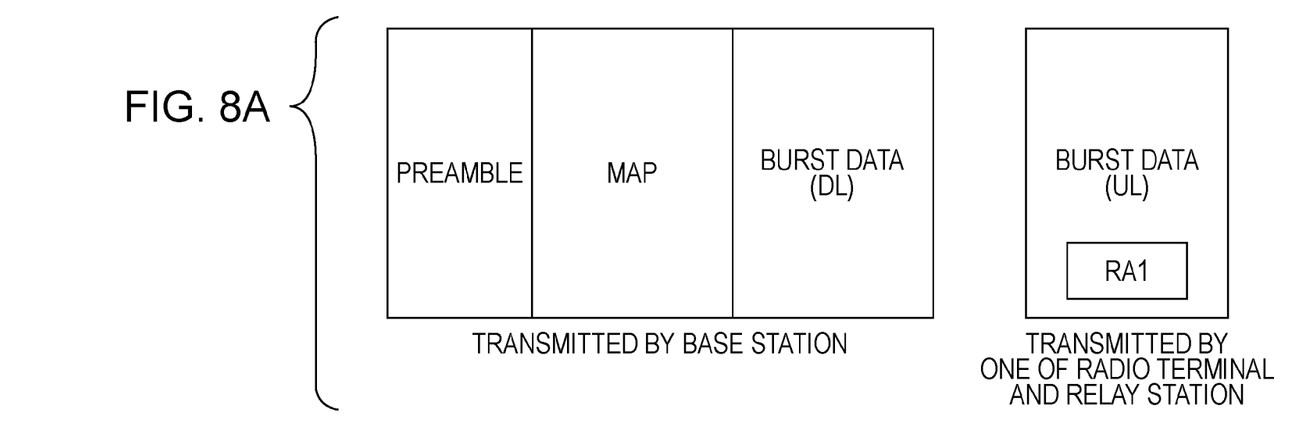
FIG. 8A illustrates a structure example of a radio frame related to the base station.
Figure 8B:
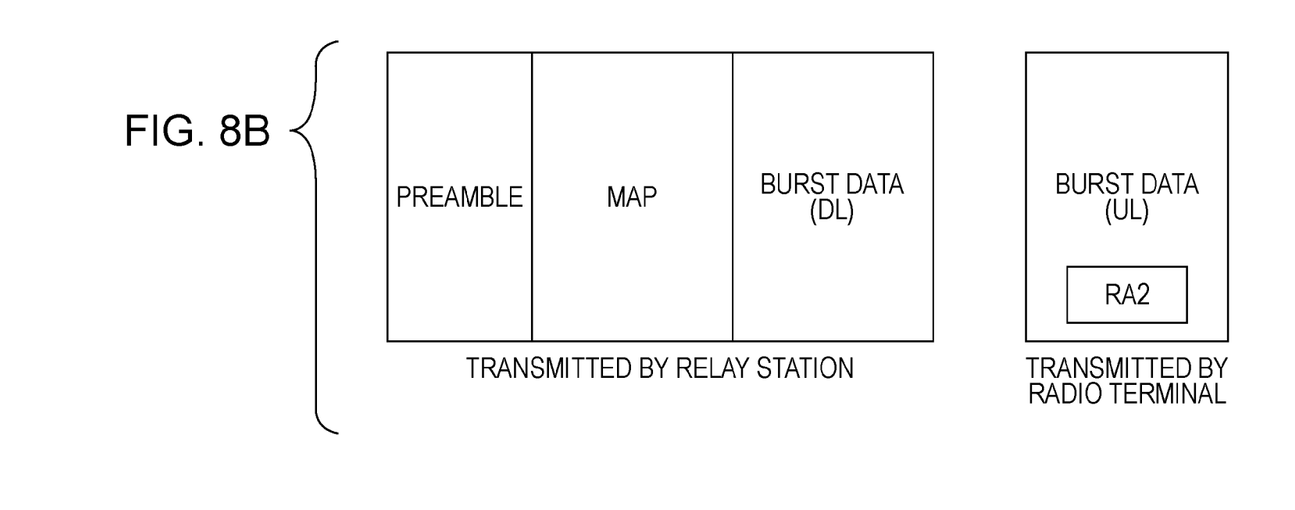
FIG. 8B illustrates a structure example of a radio frame related to the relay station.

In accordance with this embodiment as illustrated in FIG. 8A, a base station transmits the following items: i) a preamble signal for the use in synchronization, ii) radio resource information for the transmission of burst data in a down link direction (referred to as DL MAP information including transmission frequency, iii) information regarding radio resources for the use in transmission of transmission timing), and iv) radio resource information for the reception of burst data (including a random-access signal) in an up link direction (referred to as UL MAP information). A radio frame that is transmitted by the base station 2 is illustrated in FIG. 8B. The radio terminal receives the preamble signal, is synchronized with the radio frame of the base station, and then receives the UL MAP information and the DL MAP information. The radio terminal searches the MAP information to detect the radio resources to be used for the transmission and reception of the terminal in accordance with a connection ID assigned thereto. If the radio terminal detects that the MAP information indicates that the radio terminal should transmit or receive data by using any radio resource defined by the MAP information as a radio resource assigned to the radio terminal (connection ID), data is received or transmitted by the radio terminal according to the MAP information. The UL MAP information includes information specifying the radio resource for transmission of the random-access signal. The radio terminal transmits the random-access signal in the designated radio resource specified by the information.

Figure 9:
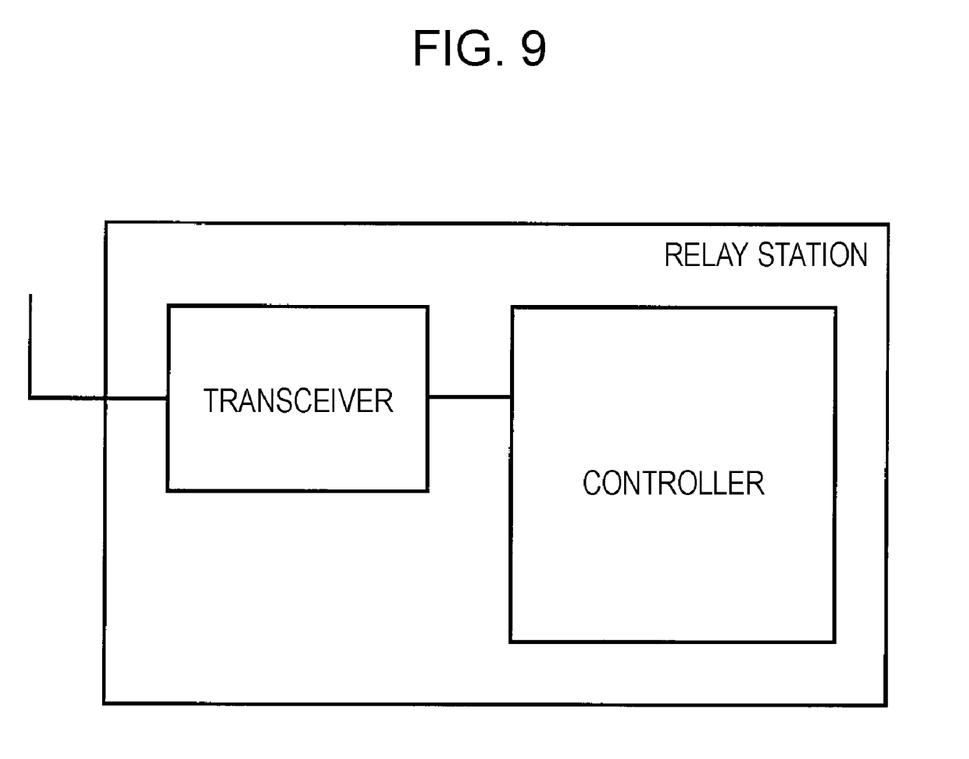
FIG. 9 illustrates a structure example of the relay station.

With reference to the radio terminal, the relay station performs a synchronization operation by receiving the preamble information, and then receives the MAP information. The relay station then identifies a radio resource for use in transmission of the random-access signal from the radio terminal. With reference to FIG. 9, the relay station includes a transceiver that is configured to transmit and receive radio signals, and a controller that is configured to control the transceiver and to exchange transmission and reception data with the transceiver. The operation of the relay station discussed below is controlled by the controller.

The relay station receives no further MAP data (broadcast information) transmitted thereafter from the base station. Preferably, the preamble is not received. The preamble for synchronization with the radio frame is transmitted intermittently from the base station, for example, every frame or every plurality of frames.

On the other hand, the relay station receives in RA1 (a radio resource for transmitting Random Access signal) each frame. When a random-access signal is received in RA1 from the radio terminal, the received random-access signal is relayed and the MAP information transmitted from the base station starts to be received. The relay station itself starts transmitting and receiving the preamble signal, the MAP information, burst data (for up link and down link). It is noted that transmission and reception of the preamble signal, the MAP information, and the burst data (for up link and down link) are not performed prior to the start. A transmission area (RA2), within which permits the radio terminal to transmit a random-access signal, may be set up in the up link burst data.

By receiving the MAP information from the base station, the relay station establishes a radio communication path with the base station. With reference to the radio terminal, the relay station may establish the radio communication path by transmitting the random-access signal to the base station (to a state in which data can be transmitted and received according to the MAP information with the connection ID or the like reset). The relay station transmits the MAP information in accordance with the scheduling of the base station or its own station, thereby performing radio communications with the radio terminal. The relay station thus performs the relay operation by transmitting the received data to the base station. The relay station also performs the relay operation by transmitting the received data from the base station to the radio terminal.

The relay station may use the detection of the random-access signal from the radio terminal in the RA1 as a trigger to transmit the radio frame to the radio terminal. Another condition may be included as a trigger. For example, the response from the base station means that communication is established between the radio terminal and the base station, and the condition that no response signal is transmitted from the base station may be used as a trigger. In that case, the base station may receive the random-access signal directly from the radio terminal or the random-access signal relayed by the relay station.

The relay station receives a notification from the base station as to whether the base station has transmitted the response in response to the random-access signal. There are cases when the relay station has detected the random-access signal but the base station fails to detect the random-access signal. Such a case is detected in response to the notification from the base station. The relay station itself starts receiving and transmitting the preamble signal, the MAP information, and the burst data (for up link and down link).

When a reception level or a reception quality of the random-access signal is above a predetermined (certain) criterion, the relay station performs the relay operation of the received random-access signal and starts receiving the MAP information from the base station. The relay station itself starts receiving and transmitting the preamble signal, the MAP information and the burst data (for up link and down link). By receiving the random-access signal of the radio terminal far from the relay station, power consumption is controlled.

In accordance with the above-described embodiment, the power consumption and the use of radio signal resources are reduced when the relay station performs the relay operation in the radio communications between the radio terminal and the base station.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay station for relaying a radio communication between radio terminals and a base station, the relay station comprising:
    a relay standby unit configured to keep the relay station in a relay standby state that enables the relay station to:
        perform processing of receiving a connection request transmitted from the radio terminals to the base station in response to broadcast information transmitted from the base station, and
        minimize power consumption by limiting transmission of signals;
    a connection request detector configured to, in the relay standby state, detect the connection request transmitted from the radio terminals to the base station in response to the broadcast information transmitted from the base station; and
    a relay operation unit configured to shift, when the connection request detector detects the connection request from the radio terminals, from the standby state to a relay operation state in which
    the relay operation unit establishes a communication link between the relay station and the base station,
    the relay operation unit provides a radio communication in the same way that a normal base station provides to terminals, and
    the relay operation unit starts to relay a radio communication between the radio terminal and the base station.

2. The relay station according to claim 1, further comprising
    a response determiner configured to determine a presence or absence of a response from the base station responsive to the connection request transmitted from the radio terminal to the base station, wherein
    the relay operation unit shifts the operational state of the relay station from the relay standby state to a relay operation state when the connection request detector detects the connection request and the response determiner does not verify a response from the base station responsive to the connection request.

3. The relay station according to claim 2, wherein
    the response determiner determines the presence or absence of the response from the base station responsive to the connection request, based on information provided from the base station and related to a response status of the base station responsive to the connection request from the radio terminal.

4. The relay station according to claim 1, wherein
    the relay operation unit determines whether to shift to the relay operation state, based on a receiving signal intensity or a receiving signal quality of the connection request transmitted from the radio terminal.

5. The relay station according to claim 4, further comprising
    a predictor for predicting the receiving signal intensity or the receiving signal quality of the connection request when the connection request transmitted from the radio terminal is received by the relay station, wherein
    the relay operation unit determines whether to shift to the relay operation state, based on the signal intensity or the signal quality of the connection request predicted by the predictor.

6. A control method for a relay station which relays radio communications between radio terminal and a base station, the control method comprising:
    restricting a reception of first radio resource information from the base station, the first radio resource information indicating a radio resource by which broadcast information is transmitted from the base station to the radio terminals;
    detecting the random-access signal in accordance with second radio resource information indicating a radio resource by which a random-access signal is transmitted from the radio terminals to the base station; and
    establishing a communication path with the base station and providing a radio communication in the same way that a normal base station provides to terminals, in response to detecting the random-access signal transmitted by the radio terminals.

7. A radio communication system, comprising:
    radio terminals;
    a base station; and
    a relay station that relays a radio communication between the radio terminals and the base station, wherein
    the relay station including:
        a relay standby unit configured to keep the relay station in a relay standby state that enables the relay station to:
            perform processing of receiving a connection request transmitted from the radio terminals to the base station in response to broadcast information transmitted from the base station, and
            minimize power consumption by limiting transmission of signals;
        a connection request detector configured to, in the relay standby state, detect the connection request transmitted from the radio terminals to the base station in response to the broadcast information transmitted from the base station; and
        a relay operation unit configured to shift, when the connection request detector detects the connection request from the radio terminals, from the standby state to an operational state in which
            the relay operation unit establishes a communication link between the relay station and the base station, the relay operation unit provides a radio communication in the same way that a normal base station provides to terminals, and the relay operation unit starts to relay the radio communication between the radio terminals and the base station, wherein an attribute of a synchronization radio signal for synchronizing the radio terminal with the base station and broadcast information in response to which the radio terminal transmits a connection request to the base station is set so that a reception coverage area of the radio terminal in a downlink direction is larger than a transmission coverage area of the radio terminal in an uplink direction.

8. The radio communication system according to claim 7, wherein a transmission level of the synchronization and broadcast information radio signal in the downlink direction is set to be higher than a transmission level for which the reception and transmission coverage areas of the radio terminals are balanced.

9. The radio communication system according to claim 7, wherein a modulation degree of a modulation method used for the synchronization and broadcast information radio signal in the downlink direction is set to be lower than a modulation degree for which the reception and transmission coverage areas of the radio terminals are balanced.

10. The radio communication system according to claim 7, wherein an encoding ratio used for the synchronization and broadcast information radio signal in the downlink direction is set to be lower than an encoding ratio for which the reception and transmission coverage areas of the radio terminals are balanced.

11. The radio communication system according to claim 7, wherein the synchronization and broadcast information radio signal in the downlink direction is transmitted with higher repetition rate so that the reception coverage area of the radio terminals in a downlink direction is larger than the transmission coverage area of the radio terminals in an uplink direction.

12. The radio communication system according to claim 7, wherein radio communications are performed in spread spectrum communications between the base station and the radio terminal, and wherein a spectrum spreading ratio used for the synchronization and broadcast radio signal in the downlink direction is set to be higher than a spectrum spreading ratio for which the reception and transmission coverage areas of the radio terminals are balanced.

13. The radio communication system according to claim 7, wherein the relay station performs communication between the relay station and the base station by means of wired communication.

14. The relay station according to claim 1, wherein the relay operation unit performs communication between the relay station and the base station by means of wired communication.

15. An apparatus comprising:
a standby unit configured to keep the apparatus in a first state that enables the apparatus to:
  perform processing of receiving a connection request transmitted from a radio terminal to a base station in response to broadcast information transmitted from the base station, and
  minimize power consumption by limiting transmission of signals;
a connection request detector configured to, in the first state, detect the connection request transmitted from the radio terminal to the base station in response to the broadcast information transmitted from the base station; and
an operation unit configured to shift, when the connection request detector detects the connection request from the radio terminal, from the first state to a second state in which the operation unit provides a radio communication between the radio terminal and the apparatus.

16. A radio communication system comprising:
at least one first station that transmits broadcast information according to which radio terminals send a connection request to the at least one first station; and
more than one second stations that are each normally operated in a first state that enables the each second station to:
  perform processing of receiving a connection request transmitted from the radio terminals to the at least one first station in response to broadcast information transmitted from the at least one first station, and
  minimize power consumption by limiting transmission of signals, wherein each of the more than one second stations is provided with a connection request detector configured to:
  detect, in the first state, the connection request transmitted from the radio terminals to the at least one first station in response to the broadcast information transmitted from the at least one first station; and
  shift, when the connection request detector detects the connection request from the radio terminals, from the first state to a second state in which the each of the more than one second stations provides a radio communication between the radio terminals and the each of the more than one second stations.

* * * * *